(12) United States Patent
Dor et al.

(10) Patent No.: US 12,252,427 B2
(45) Date of Patent: Mar. 18, 2025

(54) PRESSURIZED WATER FILTER AND WATER FILTRATION APPARATUS

(71) Applicants: Shimon Ben Dor, Kfar Adumin (IL); Ronald Silver, Bluffton, SC (US)

(72) Inventors: Shimon Ben Dor, Kfar Adumin (IL); Ronald Silver, Bluffton, SC (US)

( * ) Notice: Subject to any disclaimer, the term of this patent is extended or adjusted under 35 U.S.C. 154(b) by 481 days.

(21) Appl. No.: 17/847,247

(22) Filed: Jun. 23, 2022

(65) Prior Publication Data

US 2022/0396512 A1  Dec. 15, 2022

Related U.S. Application Data

(63) Continuation-in-part of application No. 17/131,828, filed on Dec. 23, 2020, now abandoned.

(51) Int. Cl.
| | |
|---|---|
| C02F 9/00 | (2023.01) |
| C02F 1/00 | (2023.01) |
| C02F 1/28 | (2023.01) |
| C02F 1/48 | (2023.01) |
| C02F 101/10 | (2006.01) |
| C02F 101/20 | (2006.01) |

(52) U.S. Cl.
CPC ............... C02F 9/00 (2013.01); *C02F 1/001* (2013.01); *C02F 1/28* (2013.01); *C02F 1/281* (2013.01); *C02F 1/283* (2013.01); *C02F 1/481* (2013.01); *C02F 2101/105* (2013.01); *C02F 2101/20* (2013.01); *C02F 2101/203* (2013.01); *C02F 2201/004* (2013.01); *C02F 2301/063* (2013.01); *C02F 2301/066* (2013.01); *C02F 2303/18* (2013.01); *C02F 2305/08* (2013.01)

(58) Field of Classification Search
CPC .... C02F 9/00; C02F 1/001; C02F 1/28; C02F 1/281; C02F 1/283; C02F 1/481; C02F 2101/105; C02F 2101/20; C02F 2101/203; C02F 2201/004; C02F 2301/063; C02F 2301/066; C02F 2303/18; C02F 2305/08; C02F 1/488; C02F 2201/007; C02F 2301/028
See application file for complete search history.

(56) References Cited

U.S. PATENT DOCUMENTS

| | | | |
|---|---|---|---|
| 6,210,567 B1 * | 4/2001 | Takada | A01K 63/045 210/287 |
| 6,383,372 B1 * | 5/2002 | Houck | B01D 24/18 210/336 |
| 10,287,184 B2 * | 5/2019 | Awad | C02F 1/004 |

FOREIGN PATENT DOCUMENTS

DE      10157156 A1 *   5/2003   ........... B01D 24/008

OTHER PUBLICATIONS

English Translation of DE 10157156 A1 from PE2E Search database (Year: 2003).*

* cited by examiner

*Primary Examiner* — Terry K Cecil
(74) *Attorney, Agent, or Firm* — The IP Law Firm of Guy Levi, LLC

(57) ABSTRACT

The disclosure relates to devices and systems for configurable, contaminant-specific water filtration and treatment under pressure. In particular, the disclosure relates to a contaminant-specific configurable and modular water filter and a water filtration system maintained under positive or negative pressure, comprising modular housings, each housing defining a plurality of reconfigurable compartments operable to accommodate contaminant-specific filtering units in an order configured to minimize pressure drop along the flow direction of the water.

8 Claims, 6 Drawing Sheets

PRESSURIZED WATER FILTER AND WATER FILTRATION APPARATUS

CROSS REFERENCE TO RELATED APPLICATIONS

This application is a Continuation-in-part of co-owned pending U.S. application Ser. No. 17/131,828 filed Dec. 23, 2020, titled: "Water Filter and Water Filtration Apparatus", which is incorporated herein by reference in its entirety.

BACKGROUND

The disclosure is directed to devices and systems for configurable, contaminant-specific water filtration and treatment maintained under pressure. In particular, the disclosure is directed to a contaminant-specific configurable and modular water filter and a water filtration system, comprising modular housing, each housing defining a plurality of compartment operable to accommodate contaminant-specific filtering media ordered so as to minimize pressure drop across the housing.

With the increasing world population and a limited amount of drinkable water available in the world, the water demand is also increasing and is going to further increase in the future. In some parts of the world where the local population is growing at a much higher rate than average, the availability of safe drinking water is lower than average. Geography along with inefficient management of available water plays a major contribution to this situation, whether from an arid climate or simply the lack of fresh surface water suitable for drinking, along with uncontrolled increasing water pollution. Examples of such settings may include rural villages in under-developed countries, an area nearby industrial sites in almost every country, emergency relief sites following natural disasters, or camp settings, to name a few.

Water filtration and treatment systems are being used by people around the world for many decades to convert water into a drinkable or consumable form. Governments around the world have set up various municipal water treatment plants to filter and treat the water and provide the same to their population. However, in many locales where water is very scarce, the population is unable to purchase water for consumption due to their low-income levels and the fact that municipally treated water is unavailable.

Various water filtration devices are available in the market, which is being used in households, schools, hospitals, and other individual locales, to reduce the dependency of the population on municipally treated water. These water filtration devices are mainly equipped with a gravity-based sediment filter and/or Reverse Osmosis (RO) technology that majorly filters out pollutants or solutes from the water while flowing through them. Some filtration devices are equipped with UV lamps to kill microorganisms present in the water. However, these filtration devices fail to efficiently neutralize and filter contaminants including harmful heavy metals, non-metals, and other chemical compounds present in the water.

Few filtration devices available in industries use a filter having a specific material for neutralizing a specific contaminant or chemical compound. However, water generally comprises many harmful compounds or contaminants along with solutes and other harmful microorganisms depending on the locality. For instance, Arsenic is dominantly present in the water of Asian countries. Further, mercury, fluoride, lead, and other chemicals are also present in many localities around the world. The use of multiple filtration devices for neutralizing different chemicals in multiple steps is possible, however, it becomes inefficient and costly for a normal individual (users). Thus, there is a need in the art to provide a simple and easy to use water filter and a water filtration device that allow users to efficiently configure different filtration media specific to different contaminants or chemicals in a single water filter depending on the contaminants present in the water.

In addition, the existing filtration devices employing specific filtration media allows water to flow from top to bottom through the filtration media so that the specific contaminant can be filtered or neutralized. However, these filtration devices fail to efficiently filter and neutralize the chemicals or contaminants as the water may either directly flow only through a smaller portion (generally central portion) of the filter media or the water may quickly flow through the filter media. As a result, the water does not get ample time to efficiently interact with the constituents of the filter media. Further, as the water flows only through a smaller or central portion of the filter media, that portion of the filter media may quickly degrade or become ineffective, while the other portions of the filter which least interacted with water may remain unutilized.

Furthermore, in most under-developed countries, the ability to employ high-pressure pumps for employing ultrafiltration techniques, as well reliability and pump robustness, continues to be an issue. The ability to affect filtration at relatively low pressure, for example less than 20 PSI, or up to 1 atmosphere vacuum, without adversely affecting the filtration effectiveness, remains a challenge.

There is, therefore, a need to overcome the above shortcomings and provide a water filter and a pressurized water filtration apparatus that allow easier configuration of multiple contaminant specific filtration media in a single filter and enable efficient flow of the water through each of the filtration media for efficient and enhanced filtration and neutralization of different contaminants present in the water.

BRIEF DESCRIPTION OF THE DRAWINGS

For a better understanding of contaminant-specific configurable and modular pressurized water filter and a water filtration systems disclosed, and the exemplary implementations thereof, reference is made to the accompanying examples and figures, in which similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
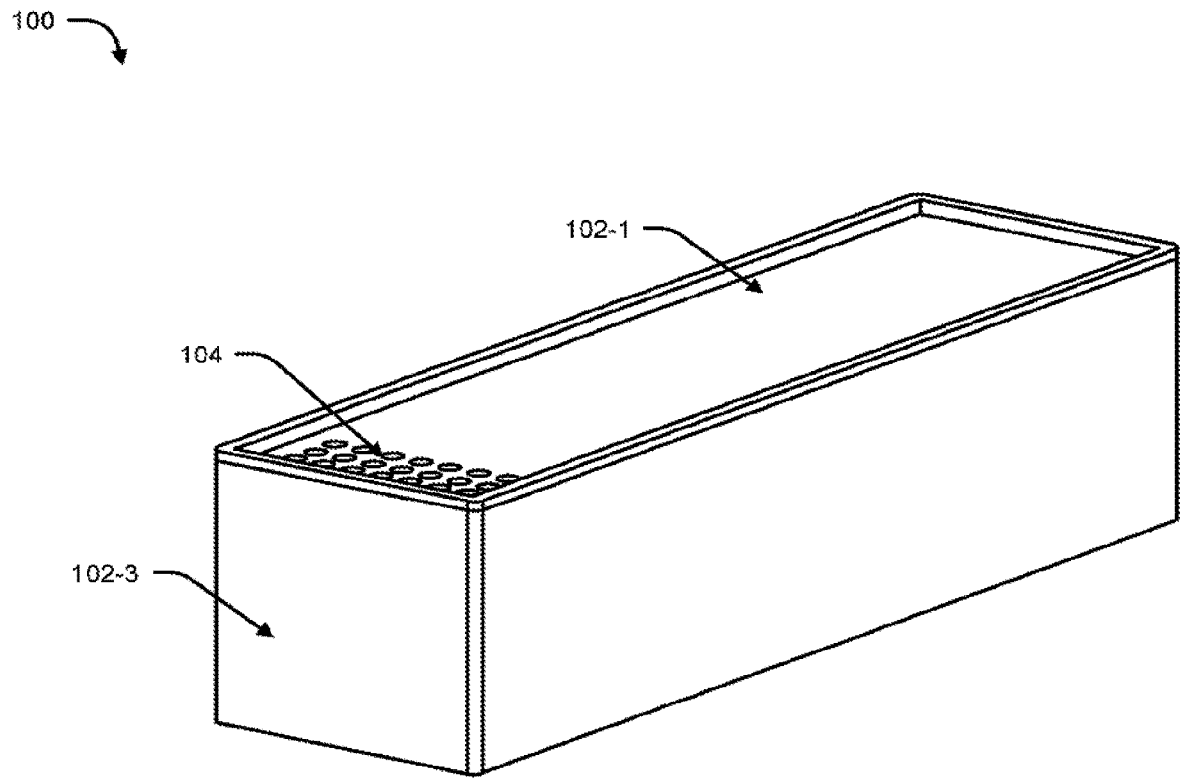
FIG. 1A illustrates a top right isometric view of an exemplary implementation of the proposed filter having an inlet in form of slots on top surface of a housing of the filter, with FIG. 1B illustrating a bottom right isometric view of the exemplary implementation of FIG. 1A, having an outlet in form of slots on a bottom surface of the housing.
Figure 1B:
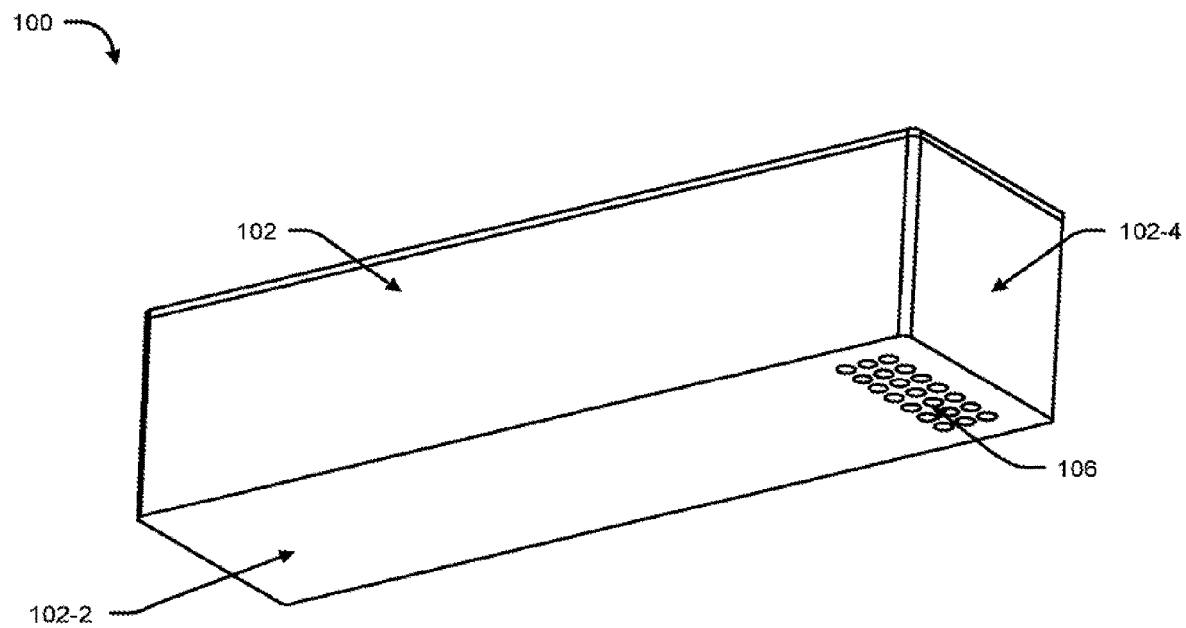

Provided herein are exemplary implementations of a modular, contaminate configurable water filter maintained under either positive pressure (e.g., water pump, potential pressure, and the like), or negative pressure (e.g. vacuum pump, Ventury effect, user's mouth), configurable for multiple contaminant-specific filtration media in a single filter, and enable efficient flow of the water through each of the filtration media for efficient and enhanced filtration and neutralization of different contaminants present in the water such that the pressure drop along the flow direction from an inlet to an outlet of the filter is minimized. The proposed filter comprises a housing having an inlet to receive water from a water source (e.g., reservoir, city water pipes, bottle interior and the like), and an outlet opening to discharge water out of the housing. The filter comprises a plurality of partitions being placed within the housing to form multiple compartments each in fluid communication with an adjacent compartment inside the housing. Each of these compartments is operable accommodate a filtration media corresponding to the contaminants sought to be filtered or neutralized in the water. The partitions define a plurality of opening at their first end, and a second end of the partitions opposite to the first end having a solid surface. The partitions are configured in the housing such that two adjacent partitions are oriented in opposite direction (rotated by 180 degrees) from each other so that the apertures of one of the two adjacent partitions faces the solid surface of the second end of the other adjacent partition. The inlet is configured on a surface of the housing in a compartment at the first end of the housing. The outlet is configured on a surface of the housing in a compartment at a second end (opposite to the first end) of the housing. This configuration of alternate 180 degrees rotated partitions allows water to flow from the inlet to the outlet through a length of each of the compartments so that the contaminants present in water gets ample time to efficiently interact with the whole area of the filtration media, thereby providing efficient and enhanced filtration of water.

As indicated, the modular, contaminant-specific pressurized filtering system disclosed herein is configured to be positioned, such that flow of liquid is directed from the inlet, through the housing to the outlet, in an undulating pattern through all the filtering modules placed within the housing. To address the pressure drop, both the opening(s) defined in each partition, as well as the filtration media used in each compartment is selected to address the specific contaminant, as well as the direction of flow.

The disclosed technology provides a water filtration apparatus that allow easier configuration of a plurality of contaminant-specific filtration media, enclosed in certain exemplary implementations, in, for example, water permeable bags, enabling the efficient flow of the water through each of the filtration media for efficient and enhanced filtration and neutralization of different contaminants present in the water, as well as reduced pressure drop along the direction of flow as determined by the pressure source.

Accordingly, and in exemplary implementation, provided herein is a water filter comprising: a pressure source; a housing enclosing a central cavity, the housing comprising: an inlet to facilitate inflow of water into the housing, and an outlet opening to facilitate outflow of the water from the housing; a plurality of partitions forming a plurality of compartments, disposed along a flow direction of the water, each partition defining at least one opening having a predetermined size at a first end of the partition, configured in parallel at predefined positions within the housing, wherein the at least one opening in each of two adjacent partitions are oriented in opposite direction from each other such that the at least one opening at the first end associated with one partitions faces a second end of the other adjacent partition; and a plurality of filtration media container, each containing a filtration media, the filtration media container disposed in a corresponding compartment, wherein each filtration media container is disposed in a predetermined compartment configured to reduce pressure drop along the water flow pathway In the proposed pressurized (e.g., between about −1.5 Atm, to about 1.5 Atm), the pressure source is in liquid communication with the inlet, or the outlet, whereby a first reservoir operable to store water to be filtered is in liquid communication with the inlet. The filter further comprises a housing defining an inlet opening(s) to receive water from the first reservoir, and an outlet opening(s) defined downstream toward the housing's distal end to discharge filtered water out of the housing after filtration. The filter comprises a plurality of partitions being placed in parallel within the housing to form compartments inside the housing. In an exemplary implementation, the partitions are disposed perpendicular to the top surface of the housing and transverse to the longitudinal axis $X_L$ defined by the housing. Each of these compartments is shaped and sized to accommodate a filtration media container corresponding to a specific contaminant sought to be filtered, removed or neutralized in the water, as well as reduce pressure drop along the flow direction of the water. The partitions are operable to maintain liquid communication between adjacent compartments, for example, in certain configurations, the partitions define an opening (or plurality of openings) at their apical end, with the basal end having a solid surface.

Furthermore, the predetermined size of the opening(s) defined in the first end (top, or bottom) of each partition is a function of at least one of: the location of the partition within the housing, the filtration media in the filtration media container, and the flow direction relative to the pressure source. The partitions are modular, and symmetric such that two adjacent partitions are oriented in opposite direction (rotated by 180 degrees) from each other so that the opening(s) of one of the two adjacent partitions faces the solid surface of the second end of the other adjacent partition. The inlet opening(s) defined in the lid portion of the housing, corresponding to the first (upstream) compartment at the upstream end of the housing. The outlet opening(s) defined at the downstream end's bottom surface of the housing. This configuration of alternate 180 degrees rotated modular partitions within the housing forces water to flow from the inlet to the outlet through each of the compartments under the effect of pressure so that the contaminants present in water gets ample time to efficiently interact with the whole area of the contaminant-specific filtration media container, thereby providing efficient and enhanced filtration of water.

The filtration media container used in the configurable, modular filtering systems disclosed herein, comprise one or more materials of predefined composition being configured in different bags, based on the contaminants to be filtered, removed, or neutralized. Depending on the number of different contaminants present in the water or contaminants to be treated, removed, filtered, or neutralized by the system, a desired number of partitions can be placed within the housing to form a predetermined number of compartments equivalent to the number of bags or filtration media container(s) required. The bags are made of a material that is capable of allowing the water to pass through them but restrict the filtration media present in the unit from leaching out of the bags. The bags are made in certain exemplary implementations, from biodegradable cloth. In the context of the disclosure, the term "bags" is interchangeable with "container" and/or "boxes" and intends to encompass other materials, such as plastic, metal, wood and other reusable materials that will enable the removal of spent filtering medium. The use of recyclable and reusable material is beneficial for lowering the carbon footprint of the system when in use. Furthermore, using plastic container in certain implementations, assist in the efficient filling of the filtering material into the containers, and their placement within the compartments formed by the number of partitions. In certain exemplary implementations, the filtering media is disposed as bulk media in the compartment formed by the partitions. For example, an activated (e.g., by phosphoric acid) carbon block (regardless of whether extruded or compressed), will not be contained in a bag, or box, but can be sized and adapted to be accommodated within a compartment ordered to form a desirable pressure drop along the flow path of the filtrate (e.g., water). In certain exemplary implementations, the average pore size, typically being between about 4.0 μm to about 20 μm will be selected as a function of the pressure exerted by the pressure source, and the type of contaminant sought to be eliminated and/or removed.

In certain exemplary implementations, the housing accommodating the filtration media container(s), is operable to couple to other housing, such that an outlet opening defined toward the downstream end of a housing, is adapted sized and configured to couple to the inlet opening defined on an upstream end of another housing, thus forming a column of filters. Accordingly and in yet another exemplary implementation, provided herein is a filtration system comprised of a plurality of vertically stacked filtration housings, each filtration housing operable to accommodate a plurality of filtration media containers, separated by a plurality of I-shaped cross-section partitions having reflectional symmetry, whereby each partition defines on opening toward an apical or basal end thereof, the partitions releasably slidably coupled to the housing via a plurality of railings' pairs configured to accommodate the flanged portion of the I-shaped partition.

Additionally, or alternatively, the housing accommodating the filtration media container(s), is operable to laterally couple to other housings, such that an outlet opening defined toward the downstream end of a housing, is adapted sized and configured to be adjacent to the outlet opening defined a downstream end of another housing, thus forming an array of filters (or an array of filtering columns). Accordingly and in an exemplary implementation, provided herein is a filtration system comprised of a plurality of laterally coupled filtration housings, each filtration housing operable to accommodate a plurality of filtration media containers, separated by a plurality of I-shaped cross-section partitions having reflectional symmetry, whereby each partition defines on opening toward an apical or basal end thereof, the partitions releasably slidably coupled to the housing via a plurality of railings' pairs configured to accommodate a the flanged portion of the I-shaped partition.

The contaminants present in the water can be, for example, at least one of: dissolved solutes, microorganisms, Arsenic, Fluoride, Mercury, lead, and the likes. The materials in the filtration media container(s) can be selected based on the type of contaminant to be filtered or neutralized. Accordingly, the number of filtration media and the partition and compartment can be provided in the proposed filter. Likewise, in another example, the filtration media can be at least one of: activated carbon, quartz, iron (sulfate, chloride etc.), chitosan, neodymium particulates, samarium cobalt particulates, AlNiCo particulates, Alumina powder and its salts (e.g., sodium, chlorohydrate, sulfate and the like), lanthanum carbonate, polyacrylamide (PAA), polydiallyldimethylammonium chloride (polyDADMAC), diatomatious earth (DE), and the like.

In an exemplary implementation, the pressure source is operable to generate positive pressure, the pressure source being in liquid communication with the water inlet of the housing, the housing comprises five partitions forming six compartments, and wherein: a first compartment closest to the water inlet comprises an activated carbon block filtration media; a second compartment downstream from the first compartment comprises a plurality of quartz particles filtration media, the plurality of quarts particles having a predetermined size and shape; a third compartment downstream from the second compartment comprises a plurality of active alumina particles, the plurality of active alumina particles having a predetermined size and shape; a fourth compartment downstream from the third compartment comprises a plurality of nanoparticles of iron oxide ($Fe_2O_3$); and a plurality of granulated carbon particles, the plurality of granulated carbon particles having a predetermined porosity; a fifth compartment downstream from the fourth compartment comprises a copper mesh forming the filtration media container, and wherein the filtration media is an open cell poly(propylene) sponge having a predetermined porosity; and a sixth compartment downstream from the fifth compartment comprises a pair of magnets, configured to form a magnetic field operable to remove the iron oxide nanoparticles.

In another exemplary implementation; the pressure source is operable to generate positive pressure, the pressure source being in in liquid communication with the water outlet of the housing, the housing comprises five partitions forming six compartments, and wherein: a first compartment comprises a pair of magnets, configured to form a magnetic field operable to remove the iron oxide nanoparticles; a second compartment upstream from the second compartment comprises a copper mesh forming the filtration media container, and wherein the filtration media is an open cell poly(propylene) sponge having a predetermined porosity; a third compartment upstream from the second compartment comprises a plurality of nanoparticles of iron oxide ($Fe_2O_3$); and a plurality of granulated carbon particles, the plurality of granulated carbon particles having a predetermined porosity; a fourth compartment upstream from the third compartment comprises a plurality of active alumina particles, the plurality of active alumina particles having a predetermined size and shape; a fifth compartment downstream from the fourth compartment comprises a plurality of quartz particles filtration media, the plurality of quarts particles having a predetermined size and shape; and a sixth compartment closest to the water outlet comprises an activated carbon block filtration media.

In certain exemplary implementations, the plurality of granulated carbon particles having a predetermined porosity, is sized and adapted to at least partially accommodate the iron oxide nanoparticle. In other words, the pore size in the granulated carbon used as the filtration media, is sized to at least partially embed (or fully encase) the iron oxide nanoparticles. Furthermore, the weight ratio between the iron oxide nanoparticles and the granulated carbon particles is between about 1:10 and about 1:20 (w/w).

Likewise and in another exemplary implementation, the pair of magnets used in the last compartments (relative to the flow direction), is configured to form a magnetic field operable to remove at least one of iron oxide nanoparticles, lead, and phosphate ions as well as other similar magnets.

Exemplary implementations will now be described more fully hereinafter with reference to the accompanying drawings, in which exemplary implementations are shown. This invention may, however, be embodied in many different forms and should not be construed as limited to the exemplary implementations set forth herein. These exemplary implementations are provided so that this invention will be thorough and complete and will fully convey the scope of the invention to those of ordinary skill in the art. Moreover, all statements herein reciting exemplary implementations of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

As illustrated in FIG. 1A to 4, according to an aspect, the proposed pressurized water filter 100 for efficient and enhanced filtration and neutralization of different contaminants present in the water can comprise pressure source 200 in liquid communication with housing 102 inlet 104 (see e.g., 1040 FIG. 5) in the case of positive pressure, or outlet 106 (see e.g., 1060, FIG. 6) in the case of negative (vacuum, e.g., as generated by a user's mouth when using the filter as part of a drinking bottle) pressure. As illustrated, housing 102 defining a central cavity. I-lousing 102 can include an inlet openings) 104 to receive water from a water reservoir or water source, and an outlet opening(s) 106 to discharge water out of housing 102. Housing 102 has a first wall 1026 closest to inlet 104, a second wall 1027 closest to outlet 106, and a pair of side walls 1028, 1028' (see e.g., FIG. 4) forming with floor 1023 (not shown) and lid 102-1, housing 102 having internal side walls 1025. The filter 100 can include multiple partitions 108-1 to 108-6 (collectively referred to as partitions 108, herein) being placed in parallel at predefined positions within the housing 102 to form multiple compartments 110-1 to 110-7 (collectively referred to as compartments 110j, herein) inside the housing 102. Each of these compartments 110j can be shaped and sized to accommodate filtration media container 402q corresponding to the contaminants to be filtered or neutralized in the water. As illustrated in FIGS. 3A-3B, the partition 108i can define opening(s) 302p (also referred to as first apertures 302, herein) at their first end 303, and a second end 303' of the partitions opposite to the first end can have a solid surface 304. As indicated, the plurality of partitions 108i forming a plurality of compartments 110j, disposed along a flow direction of the water, each $i^{th}$ partition 108i defining at least one opening 302p having a predetermined size, wherein the predetermined size of the at least one opening 302p defined in the first end 303 of each $i^{th}$ partition 108i is a function of at least one of: the location of the $i^{th}$ partition 108i within housing 102, the filtration media in the filtration media container 402q, and the flow direction relative to pressure source 200.

Positive pressure can be generated with any pump operable to generate pressure, such as positive displacement pump, duplex and triplex pump, or centrifugal pumps. Similarly, positive pressure can be generated by potential energy, of a reservoir disposed above the filter at a height configured to generate water pressure of between about 0.5 Atmosphere (Atm.), to about 5.0 Atm. The same pumps can generate negative pressure, operable to generate between −0.1 Atm., to about −5.0 Atm. Likewise a user can generate the negative pressure by sucking on a straw in liquid communication with an outlet of the filter (see e.g., FIG. 6) whereby the outlet can be in liquid communication with the water source (e.g., water bottle). It is noted, that although certain figures illustrate a filter having a quadrilateral cross section, any cross section polygon transverse to longitudinal axis $X_L$ up and including a circular cross section is also contemplated.

Partitions 108i having an I-shaped cross section with flanged lateral walls 301, 301' can be configured in housing 102 such that two adjacent partitions 108i are oriented in opposite direction (rotated by 180 degrees) from each other so that opening(s) 302p of one of two adjacent partitions 108i faces solid surface of second end 303' of other adjacent partition 108i. For example, partition 108-1 can be with opening(s) 302p toward its basal end 303, and be positioned 180" rotated from partition 108-2 adjacent to 108-1. Partitions 108i can be shaped and sized equivalent to an inner dimension of housing 102 (in other words, be accommodated within housing 102), so that each $i^{th}$ partition 108i completely fits within housing 102 without any gap therebetween, and water can flow between two compartments 110j only through their corresponding opening(s) 302p.

Filter 100 can include one or more filtration media container(s) 402q (402-1 to 402-7 collectively referred to as filtration media container(s) 402q, herein) being configured in at least one of compartments 110j-1 to 110-7. Filtration media container(s) 402q can be adapted to filter 100 and neutralize one or more contaminants present in the water while flowing across the length of corresponding compartments 110j (110-1 to 110-7). Filtration media container(s) 402q comprise one or more materials of predefined composition being configured in, for example, biodegradable cloth bag, the composition is based on the contaminants to be filtered, removed, or neutralized. The bag is made in an exemplary implementation of a material that is capable of allowing the water to pass through them but restrict the filled filtration media from leaching out of the bag.

In an illustrative implementation, inlet opening 104 defined toward an upstream end of housing 102 with internal side walls 1025 disposed in parallel with the housing's longitudinal axis $X_L$ can be configured on surface (interchangeable with lid, or cover) 102-1 having an upper surface and a lower surface defining peripheral groove 1021 (see e.g., FIG. 4), sized and configured to receive accommodate resilient O-ring 1022 (see e.g., FIG. 2), configured to engage housing 102 and opening in a first compartment 110-1 (also referred to as upstream end compartment 110-1, herein) at upstream facet 102-3 of the housing 102, and outlet opening(s) 106 can be configured on downstream facet 102-2 of housing 102 and opening in a second compartment 110-7 (also referred to as outlet end compartment 110-7, herein) at a second end 102-4 (opposite to the first end 102-3) of the housing 102, such that one or more third compartments 110j-2 to 110-6 are formed between the first compartment 110-1 and the second compartment 110-7. This configuration of the inlet opening(s) 104 and outlet opening(s) 106 opening in the first compartment 110-1 and second compartment 110-7, respectively, along with alternate 180 degrees rotated partitions 108 within the housing 102, allows water to flow from the inlet opening(s) 104 to outlet opening(s) 106 through a length of each of the compartments from the first end 102-3 to the second end 102-4 of the housing 102, so that the contaminants present in water gets ample time to efficiently interact with the whole area of the filtration media, thereby providing efficient and enhanced filtration of water, To ensure complete emptying of the filter, the number of compartments 110$jp$ has to be even, such that the last partition 108$i$ is positioned such that opening(s) 302$p$ is (are) always positioned basally.

The inlet opening(s) 104 can be in form of a set of second apertures 104 (also referred to as second apertures 104, herein) and outlet opening(s) 106 can be in form of a set of third apertures 106 (also referred to as third apertures 106, herein) such that the second apertures 104 are uniformly present on the top surface over filtration media present in the first compartment 110-1, and the third apertures 106 are uniformly present on the bottom surface beneath the filtration media present in the second compartment 110-7. This uniform distribution of multiple second apertures 104 and third apertures 106 allow the water to enter housing 102 and efficiently pour-over or pass through the entire area of the filtration media present in the first compartment 110-1, as well as the second compartment 110-7.

Figure 4:
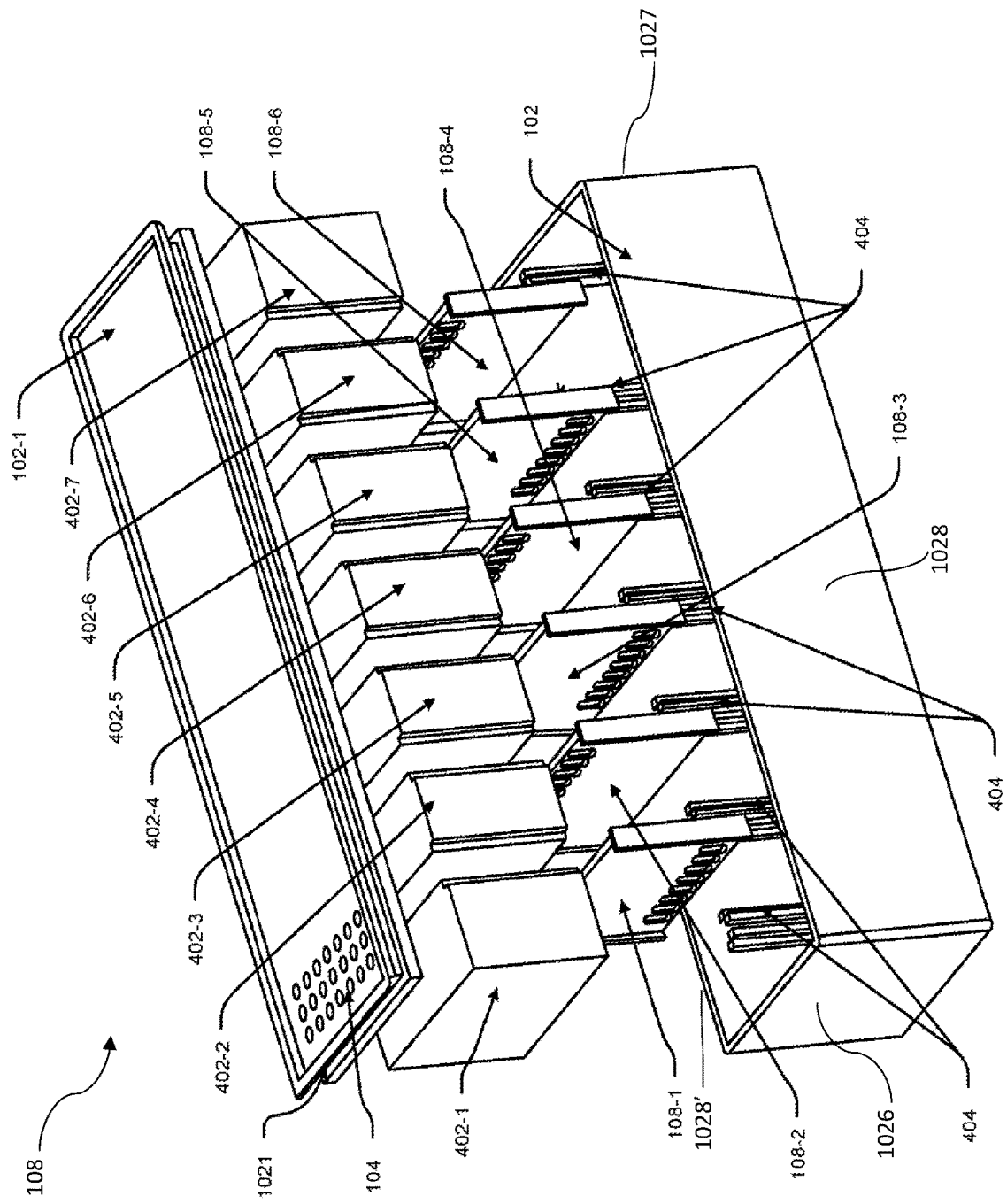
FIG. 4 illustrates an exploded view of the exemplary implementation of the proposed filter.

As illustrated in FIG. 4, housing 102 can include one or more slots 404 (collectively referred to as slots 404, herein) positioned at the predefined positions within housing 102, and configured to accommodate and hold Partitions 108$i$ within housing 102 to form the compartments 110$j$. In the context of the disclosure, the term "accommodate" means that each partition 108, is operably slidably coupled to slots 404 and abut against the internal sidewall of housing 102. In an implementation, the term "slidably coupled" is used in its broadest sense to refer to elements which are coupled in a way that permits one element (e.g., partition 108) to slide or translate with respect to another element (e.g., slot 404)

In an exemplary implementation, at least one surface 102-1 of the housing 102 can be removably configured with the housing 102, to facilitate placement and removal of Partitions 108$i$, and filtration media container(s) 402 within and from the housing 102 as required.

Figure 2:
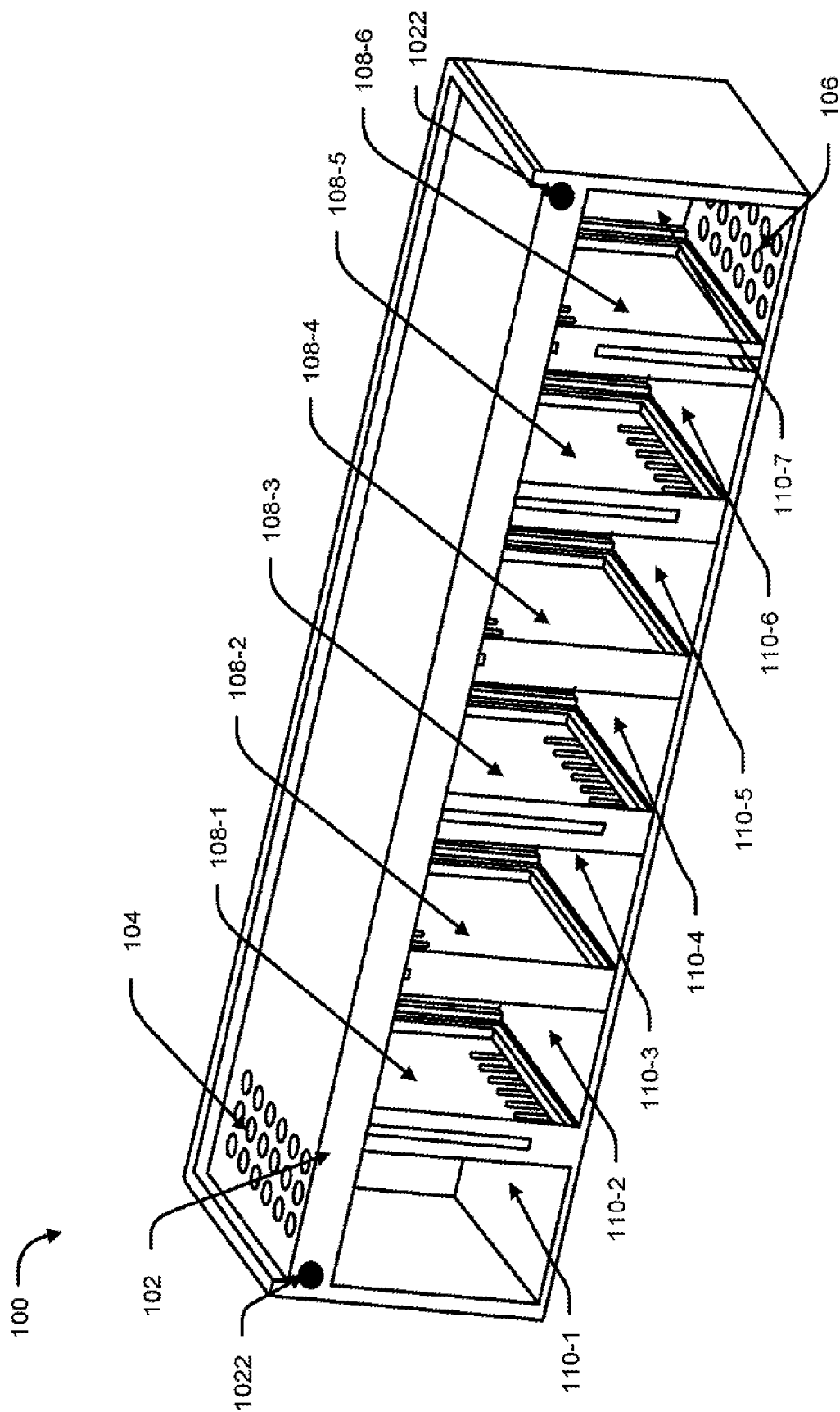
FIG. 2 illustrates an exemplary top left cutaway isometric view of the exemplary implementation of the proposed filter.
Figure 3A:
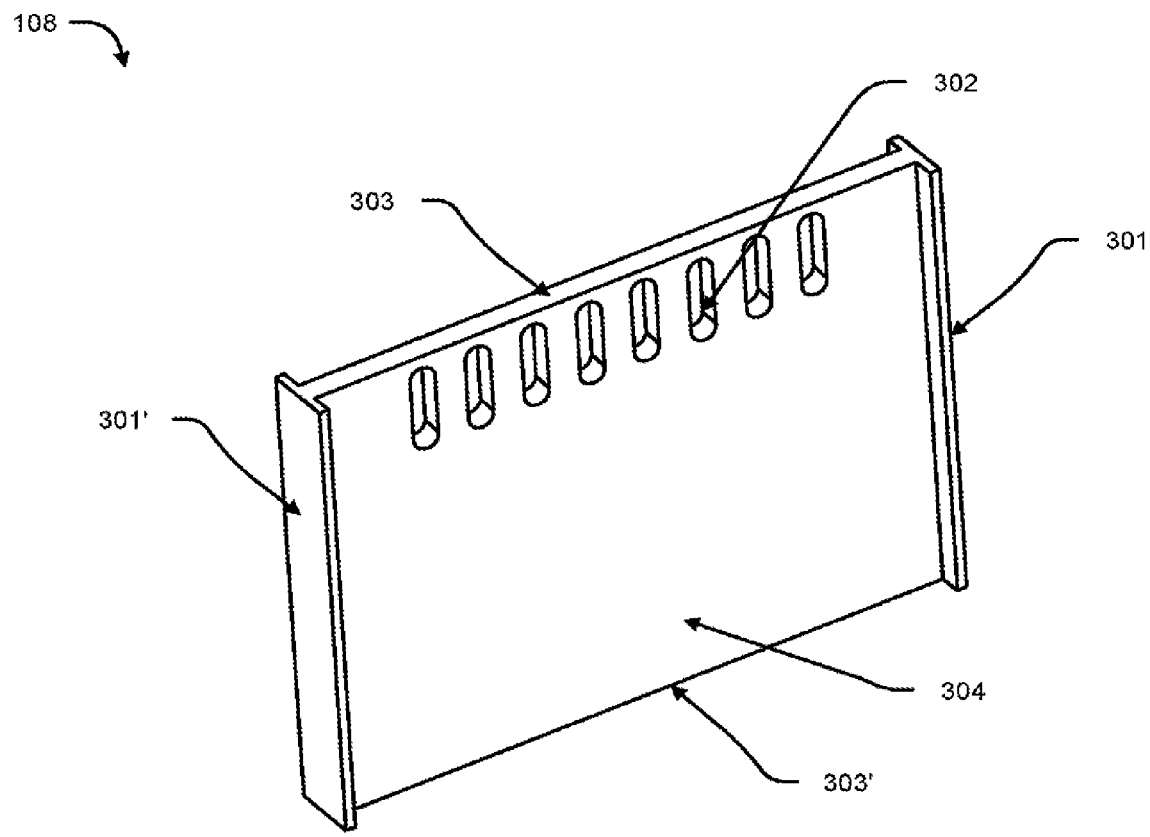
FIG. 3A illustrates an exemplary view of a partition of the proposed filter, with FIG. 3B illustrating the partition of FIG. 3A when rotated by an angle of ISO degrees.
Figure 3B:
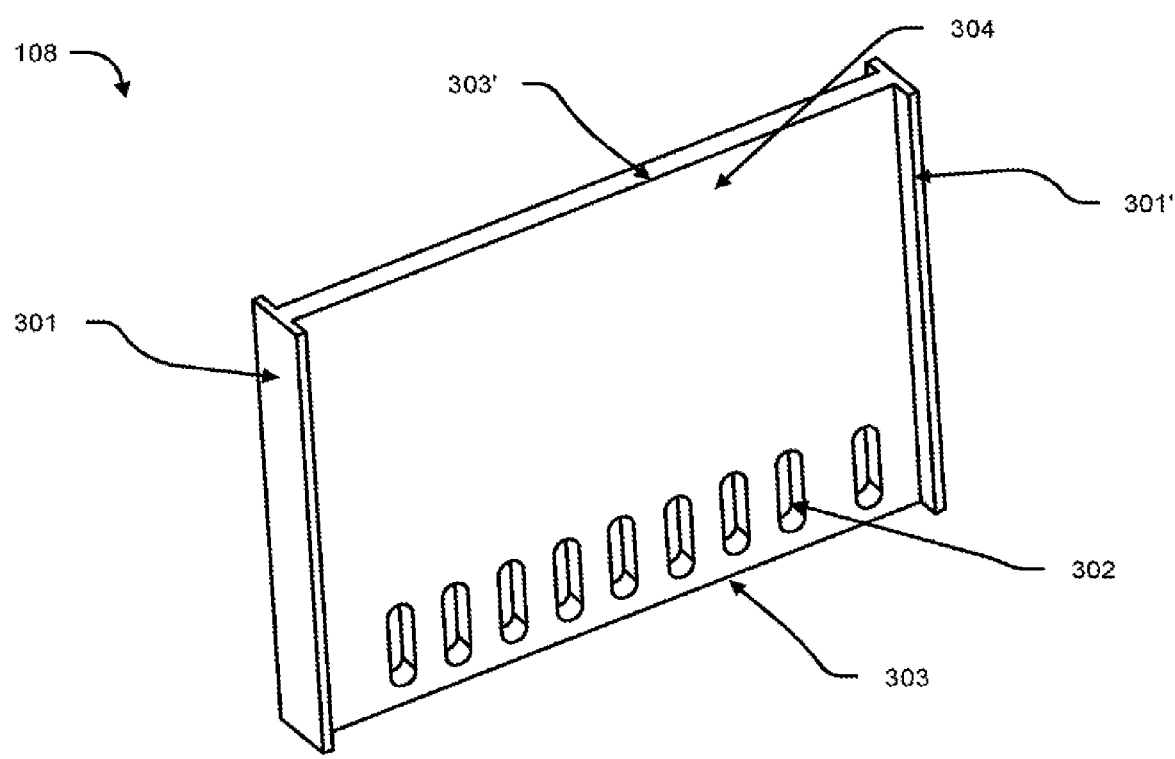

As illustrated in FIGS. 2 and 4, in a first implementation, Partitions 108$i$ can be configured perpendicular to the two opposite surfaces 102-1 and 102-2 (top and bottom surface) of the housing 102, at the predefined positions between the first end 102-3 (near the left surface) and the second end 102-4 (near the right surface) of the housing 102 to form the third compartments 110-2 to 110-6 being arranged in a horizontal direction between the first compartment 110-1 and the second compartment 110-7 of the housing 102.

In an implementation, the inlet opening(s) 104 and outlet opening(s) 106 can be configured near the upstream end and the downstream end of housing 102, respectively, on two opposite surfaces (interchangeable with lid, or cover) 102-1 and 102-2 (top and bottom) of housing 102 such that that inlet opening(s) 104 is at a predefined height above outlet opening(s) 106. Further, the uniform distribution of inlet opening(s) 104 and outlet opening(s) 106 allow the water to enter housing 102 and efficiently pour-over or pass through the entire area of filtration media container(s) 402$q$ present in first compartment 110-1, as well as the second compartment 110-7. As a result, assuming an even number of compartments, the water from a water reservoir or water source can be uniformly poured from the top of housing 102 into the first compartment through inlet opening(s) 104. And under pressure, an automated flow of water can be enabled from one compartment to another in an alternate upward and downward direction fashion and finally coming out of the third slots 106 at the bottom surface in the second compartment 110-7 of housing 102, without any external pumping unit or means. This flow of water in an alternate upward and downward fashion across the length of adjacent compartments allows the water to get ample time to efficiently interact with the whole area of the corresponding filtration media, thereby providing efficient and enhanced filtration of water.

Figure 5:
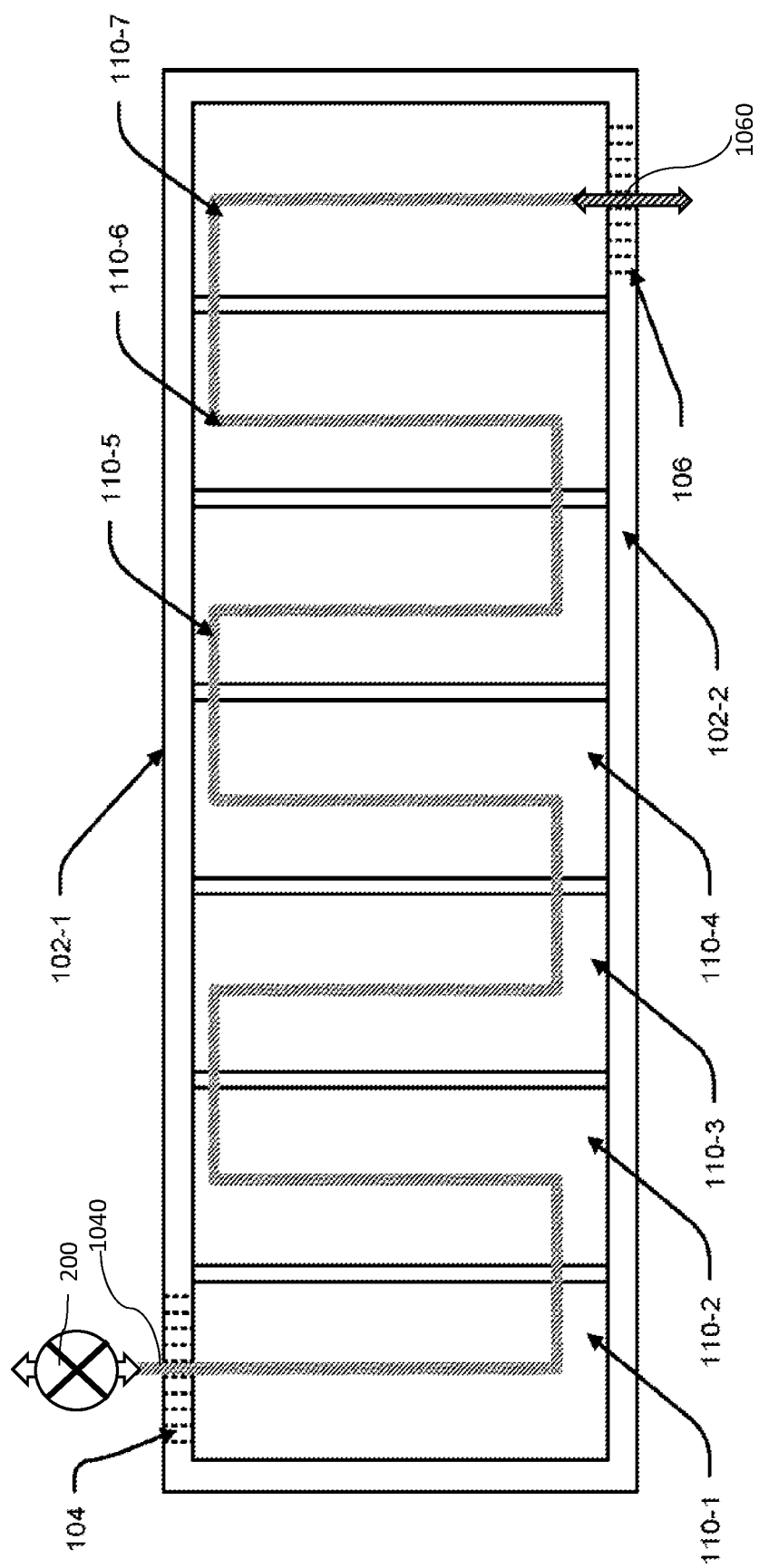
FIG. 5 is a schematic illustrating the flow of water in the proposed filter as enabled by the alternating opening in the partitions.

For example, and as illustrated in FIG. 5, pressure source 200 is operable to generate positive pressure, whereby pressure source 200 being in liquid communication with water inlet 104 of housing 102, housing 102 comprises five partitions 108$i$ (108-1-108-5) forming six compartments 110$j$ (110-1-110-6), and wherein: first compartment 110-1, closest to water inlet 104 comprises activated carbon block filtration media; second compartment 110-2 downstream from first compartment 110-1 comprises plurality of quartz particles filtration media, whereby the plurality of quarts particles have predetermined size (e.g., between about 0.1 mm, to about 2.0 cm) and shape (e.g., spherical, rods, needles and the like); third compartment 110-3 downstream from second compartment 110-2 comprises plurality of active alumina particles, whereby the plurality of active (in other words, by dehydroxylation of $AlOH_3$, forming $Al_2O_3$, aluminum oxide) alumina particles having predetermined size (e.g., between about 0.5 mm, to about 4.0 cm) and shape; fourth compartment 110-4 downstream from third compartment 110-3 comprises plurality of nanoparticles (e.g., between about 100 nm, to about 300 nm) of iron oxide ($Fe_2O_3$); and plurality of granulated carbon particles, whereby the plurality of granulated carbon particles are each having predetermined porosity (e.g., with average hole size of between about 4.0 µm, to about 20 µmm, occupying between 11% to about 25% volume of the granules (or carbon block)); fifth compartment 110-5 downstream from fourth compartment 110-4 comprises copper mesh forming filtration media container 402$q$, and wherein filtration media is open cell poly(propylene) sponge having predetermined porosity; and sixth compartment 110-6 downstream from fifth compartment 110-5 comprises pair of magnets (not shown), configured to form magnetic field operable to remove iron oxide nanoparticles.

In the context of the disclosure, the term "pressure drop" means and includes the change in the pressure of the flow of water as it enters housing 102 through an inlet 104 and as it exits outlet 106 (i.e., the static pressure difference between the water inlet side and the water outlet side of housing 102).

Figure 6:
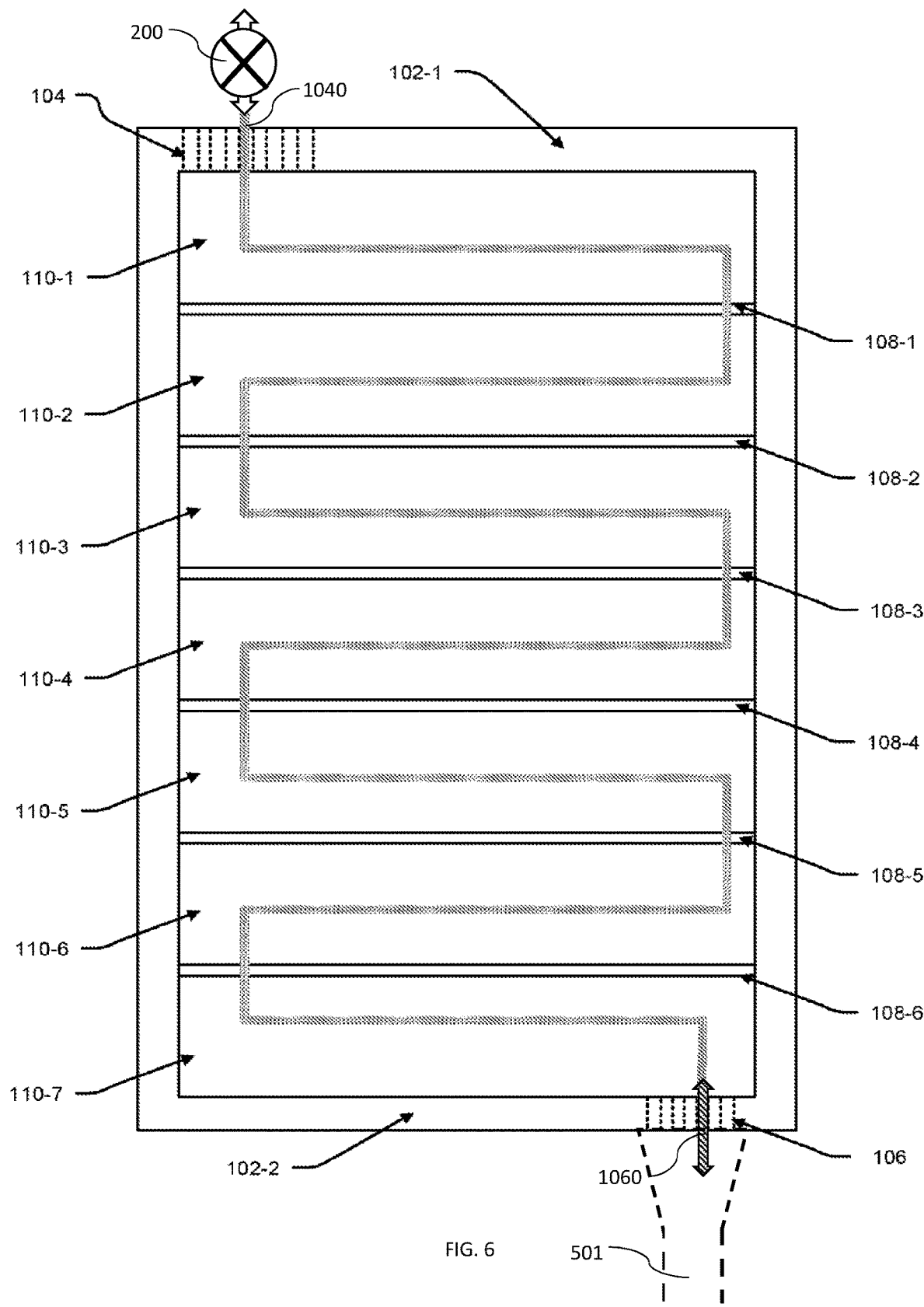
FIG. 6 illustrates the flow of water in another exemplary implementation of the proposed filter in left and right direction.

As illustrated in FIG. 6, in a second implementation of the proposed filter, Partitions 108$i$ can be positioned in parallel to the two opposite surfaces 102-1 and 102-2 (top and bottom surface) of the housing, at predefined positions between the first end 102-1 (near the top surface) and the second end 102-2 (near the bottom surface) of the housing 104 to form the third compartments 110-2 to 110-6 being arranged in a vertical direction between the first compartment 110-1 at the top, and the second compartment 110-7 at the bottom.

In an implementation of the second implementation, inlet opening(s) 104 and the outlet 104 can be configured near the first end and the second end of housing 102, respectively, on two opposite surfaces 102-1 and 102-3 (top and bottom) of housing 102 such that that inlet opening(s) 104 is at a predefined height above outlet opening(s) 106. As a result, the water from a water reservoir or water source can be uniformly poured from the top of housing 102 into the first compartment 110-1 through inlet opening(s) 104, and under the effect of pressure, an automated flow of water can be enabled from one compartment to another in an alternate left and right direction fashion and finally coming out of the outlet at the bottom in the second compartment 110-7, without any external pumping unit or means. This flow of water in an alternate left and right direction across the length of adjacent compartments allows the water to get ample time to efficiently interact with the whole area of the corresponding filtration media container(s) 402g, thereby providing efficient and enhanced filtration of water.

In a third implementation (not shown in Figures), the inlet and the outlet can be configured at a first end and a second end of the housing, respectively, on two adjacent surfaces of the housing such that that the inlet is configured at a predefined height above the outlet. For instance, the inlet can be configured on the top surface at the first end of the housing, and the outlet can be configured on a right surface or left surface adjacent to the top surface at the second end (opposite to the first end) of the housing. Alternatively, the inlet can be configured on a right surface or left surface adjacent to a bottom or top surface at the first end of the housing, and the outlet can be configured on the bottom surface of the housing. The partitions can be configured parallel to one of the two adjacent surfaces of the housing, at the predefined positions between the first end and the second end of the housing to form the compartments within the housing.

In an implementation, when the partitions are configured parallel to the left or right surface of the housing, the compartments are arranged in a horizontal direction between the left and right surface or first end and second end of the housing. In another implementation, when the partitions are configured parallel to the top surface, the compartments are arranged in a vertical direction between the top surface and bottom surface of the housing.

According to an aspect, the present disclosure elaborates upon a water filter comprising a housing enclosing a central cavity, the housing comprises, an inlet to facilitate inflow of water into the housing, and an outlet opening to facilitate outflow of the water from the housing; one or more partitions having a set of first apertures at its first end, the one or more partitions being configured parallelly at predefined positions within the housing to from at least two compartments between the inlet and the outlet, wherein two adjacent partitions among the one or more partitions are oriented in opposite direction from each other such that the set of first apertures associated with one of the two adjacent partitions faces a second end of the other adjacent partition, and wherein the set of first apertures associated with the one or more partitions allows the water to flow from the inlet to the outlet through a length of each of the at least two compartments, and one or more filtration media configured in at least one of the at least two compartments, wherein the one or more filtration media are adapted to filter and neutralize one or more contaminants present in the water while flowing across the length of the corresponding compartments.

In an exemplary implementation, the housing comprises one or more slots positioned at the predefined positions within the housing, and configured to accommodate and hold the one or more partitions within the housing to form the at least two compartments.

In an exemplary implementation, the inlet comprises a set of second apertures, and the outlet comprises a set of third apertures.

In an exemplary implementation, the inlet and the outlet are configured at a first end and a second end of the housing, respectively, on two opposite surfaces of the housing such that that the inlet is at a predefined height above the outlet.

In an exemplary implementation, the one or more partitions are configured perpendicular to the two opposite surfaces of the housing, at the predefined positions between the first end and the second end of the housing to form the at least two compartments between the inlet and the outlet.

In an exemplary implementation, the one or more partitions are configured parallelly to the two opposite surfaces of the housing, at the predefined positions between the two opposite surfaces to from at least two compartments between the inlet and the outlet in the housing.

In an exemplary implementation, the inlet and the outlet are configured at a first end and a second end of the housing, respectively, on two adjacent surfaces of the housing such that that the inlet is configured at a predefined height above the outlet.

In an exemplary implementation, the one or more partitions are configured parallel to one of the two adjacent surfaces of the housing, at the predefined positions between the first end and the second end of the housing to form the at least two compartments between the inlet and the outlet.

In an exemplary implementation, at least one surface of the housing is removably configured with the housing.

According to another aspect, the present disclosure elaborates upon water filtration apparatus comprising, a first reservoir configured to store water, a housing enclosing a central cavity being fluidically coupled to the first reservoir, and positioned below the first reservoir, wherein the housing comprises an inlet to facilitate inflow of water from the first reservoir into the housing, and an outlet opening to facilitate outflow of the water from the housing; one or more partitions having a set of first apertures at its first end, the one or more partitions being configured parallelly at predefined positions within the housing to from at least two compartments between the inlet and the outlet, wherein two adjacent partitions among the one or more partitions are oriented in opposite direction from each other such that the set of first apertures associated with one of the two adjacent partitions faces a second end of the other adjacent partition, and wherein the set of first apertures associated with the one or more partitions allows the water to flow from the inlet to the outlet through a length of each of the at least two compartments, and one or more filtration media configured in at least one of the at least two compartments, wherein the one or more filtration media are adapted to filter and neutralize one or more contaminants present in the water while flowing through the length of the corresponding compartments.

In an exemplary implementation, the apparatus comprises a second reservoir fluidically coupled to the housing, and configured to receive the filtered and decontaminated water from the outlet of the housing.

In an exemplary implementation, the first reservoir is adapted to be removably coupled on an upper surface of the housing, and the second reservoir is adapted to be removably coupled on a bottom surface of the housing.

In an exemplary implementation, the inlet is configured on the upper surface, and the outlet is configured on the bottom surface such that that the inlet is at a predefined height above the outlet.

In an exemplary implementation, the one or more partitions are configured perpendicular to the upper surface and the bottom surface of the housing to form the at least two compartments between the inlet and the outlet.

In an exemplary implementation, the one or more partitions are configured parallelly to the upper surface and the bottom surface of the housing to from the at least two compartments between the inlet and the outlet.

In the following description, numerous specific details are set forth in order to provide a thorough understanding of exemplary implementations of the present invention. It will be apparent to one skilled in the art that exemplary implementations of the present invention may be practiced without some of these specific details.

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

In the context of the disclosure, the term "engage" and various forms thereof, refer to the application of any forces that tend to hold members, components, or elements together against inadvertent or undesired separating forces (e.g., such as may be introduced during use of the filter). The term "engaged" may particularly mean frictional coupling or the interlocking of two or more components of the filter device, e.g. a spline, thread, or meshed teeth connection. It is to be understood, however, that engagement of the elements, components or members does not in all cases require an interlocking connection that is maintained against every conceivable type or magnitude of separating force.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" comprises plural reference unless the context clearly dictates otherwise. Also, as used in the description herein, the meaning of "in" comprises "in" and "on" unless the context clearly dictates otherwise.

The phrases "in an exemplary implementation," "according to one implementation," and the like generally mean the particular feature, structure, or characteristic following the phrase is included in at least one implementation of the present disclosure, and may be included in more than one implementation of the present disclosure. Importantly, such phrases do not necessarily refer to the same implementation.

While exemplary implementations of the present invention have been illustrated and described, it will be clear that the invention is not limited to these exemplary implementations only. Numerous modifications, changes, variations, substitutions, and equivalents will be apparent to those skilled in the art, without departing from the spirit and scope of the invention, as described in the claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

In the context of the disclosure, the term "operable" means the system and/or the device, or a certain element is frilly functional, sized, adapted and calibrated, comprises elements for, and meets applicable operability requirements to perform a recited function when activated, coupled, implemented, actuated, effected, or realized when associated with the system and/or the device.

In the context of the disclosure, the term "liquid communication" refers to a flow line (e.g. tubing or ducts) allowing for passage of liquid between two units, optionally through a number of intermediate units. A pressure source is in liquid communication with a filter for instance if the outlet for the filter is connected with an inlet of the mouth of a user and the like. Furthermore, as used herein, the term "liquid communication" means that liquid such as water is able to travel from one compartment or component to another compartment or component. The filter assembly can but need not include a liquid distribution layer, or the like, to channel or direct liquid to the other location(s).

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various exemplary implementations of the invention, other and further exemplary implementations of the invention may be devised without departing from the basic scope thereof. The scope of the invention is determined by the claims that follow. The invention is not limited to the described exemplary implementations, versions or examples, which are included to enable a person having ordinary skill in the art to make and use the invention when combined with information and knowledge available to the person having ordinary skill in the art.

The invention claimed is:

1. A water filter comprising:
a) a pressure source:
b} a housing enclosing a central cavity, the housing comprising:
an inlet to facilitate inflow of water into the housing, and an outlet opening to facilitate outflow of the water from the housing;
a plurality of partitions forming a plurality of compartments, disposed along a flow direction of the water, each partition defining at least one opening having a predetermined size at a first end of the partition, configured in parallel at predefined positions with the housing, wherein the at least one opening in each of two adjacent partitions are oriented in opposite directions from each other such that the at least one opening at the first end associated with one partition faces a second end of the other adjacent partition; and a plurality of filtration media containers, each containing a filtration media, each of the filtration media containers disposed in a corresponding compartment, wherein each filtration media container is disposed in a predetermined compartment configured to reduce pressure drop along the water flow pathway, the housing comprising five partitions forming six compartments, and wherein a first compartment closest to the water inlet comprises an activated carbon block filtration media; a second compartment downstream from the first compartment comprises a plurality of quartz particles filtration media, the plurality of quarts particles having a predetermined size and shape; a third compartment downstream from the second compartment comprises a plurality of active alumina particles, the plurality of active alumina particles having a predetermined size and shape; a fourth compartment downstream from the third compartment comprises a plurality of nanoparticles of iron oxide ($Fe_2O_3$) and a plurality of granulated carbon particles, the plurality of granulated carbon particles having a predetermined porosity; a fifth compartment downstream from the fourth compartment comprises a copper mesh forming a filtration media container and wherein a filtration media therein is an open cell polypropylene sponge having a predetermined porosity; and a sixth compartment downstream from the fifth compartment comprises a pair of magnets, configured to form a magnetic field operable to remove the iron oxide nanoparticles.

2. The water filter of claim 1, wherein the pressure source is in liquid communication with the inlet or the outlet.

3. The water filter of claim 2, wherein the pressure source is operable to generate positive pressure.

4. The water filter of claim 2, wherein the pressure source is operable to generate vacuum.

5. The water filter of claim 2, wherein the predetermined size of the at least one opening defined in the first end of each partition is a function of at least one of the location of the partition within the housing, the filtration media in the filtration media container, and the flow direction relative to the pressure source.

6. The water filter of claim 5, wherein the first compartment is formed between a first wall of the housing and the partition disposed first along the flow direction of the water, and wherein a last compartment is formed between a second wall of the housing and the partition disposed last along the flow direction of the water.

7. The water filter of claim 1, wherein the predetermined porosity of the granulated carbon particles is sized and adapted to at least partially accommodate the iron oxide nanoparticles.

8. The water filter of claim 7, wherein the weight ratio between the iron oxide nanoparticles and the granulated carbon particles is between about 1:10 and about 1:20 (w/w).

* * * * *